(12) United States Patent
Gaudreau et al.

(10) Patent No.: US 6,375,398 B1
(45) Date of Patent: Apr. 23, 2002

(54) TOOL HOLDER ASSEMBLY

(75) Inventors: Jack R. Gaudreau, New Hudson; Terry R. Bleau, Livonia; Jeffrey L. Chalmers, Ferndale, all of MI (US)

(73) Assignee: FL Toolholders, Inc., Livonia, MI (US)

( * ) Notice: Subject to any disclaimer, the term of this patent is extended or adjusted under 35 U.S.C. 154(b) by 0 days.

(21) Appl. No.: 09/533,742

(22) Filed: Mar. 23, 2000

(51) Int. Cl.⁷ .............................. B23C 9/00; B23B 31/22
(52) U.S. Cl. ....................... 409/232; 279/75; 408/239 R
(58) Field of Search ................................. 409/231, 232, 409/234; 279/75, 103, 133; 408/239 A, 239 R, 57

(56) References Cited

U.S. PATENT DOCUMENTS

| 3,893,677 A | * | 7/1975 | Smith | 279/75 |
| 4,082,472 A | * | 4/1978 | Mossner et al. | 408/57 |
| 4,171,821 A | * | 10/1979 | Miller | 279/75 |
| 4,710,079 A | * | 12/1987 | Smith et al. | 409/234 |
| 4,722,645 A | * | 2/1988 | Regan | 408/239 A |

* cited by examiner

*Primary Examiner*—William Briggs
(74) *Attorney, Agent, or Firm*—Gifford, Krass, Groh, Sprinkle, Anderson & Citkowski, P.C.

(57) ABSTRACT

A toolholder assembly is disclosed having an elongated spindle adapted to be rotatably driven about a longitudinal axis. The spindle also includes a longitudinally extending bore open at one end. A chuck has a collet at one end for holding a tool and an elongated shank at its other end adapted for insertion into the spindle bore. A ball lock assembly releasably coaxially secures the chuck to the spindle upon insertion of the chuck shank into the spindle bore to an operable position. The chuck also includes a conical surface at the free end of the shank. This free end of the shank engages a spring loaded piston positioned at the innermost end of the spindle bore when the chuck is inserted into the spindle to its operable position and this piston includes a conical surface complementary to the conical surface on the shank. The cooperation between the ball lock assembly and the piston coaxially and securely, but releasably, secures the chuck to the spindle.

15 Claims, 2 Drawing Sheets

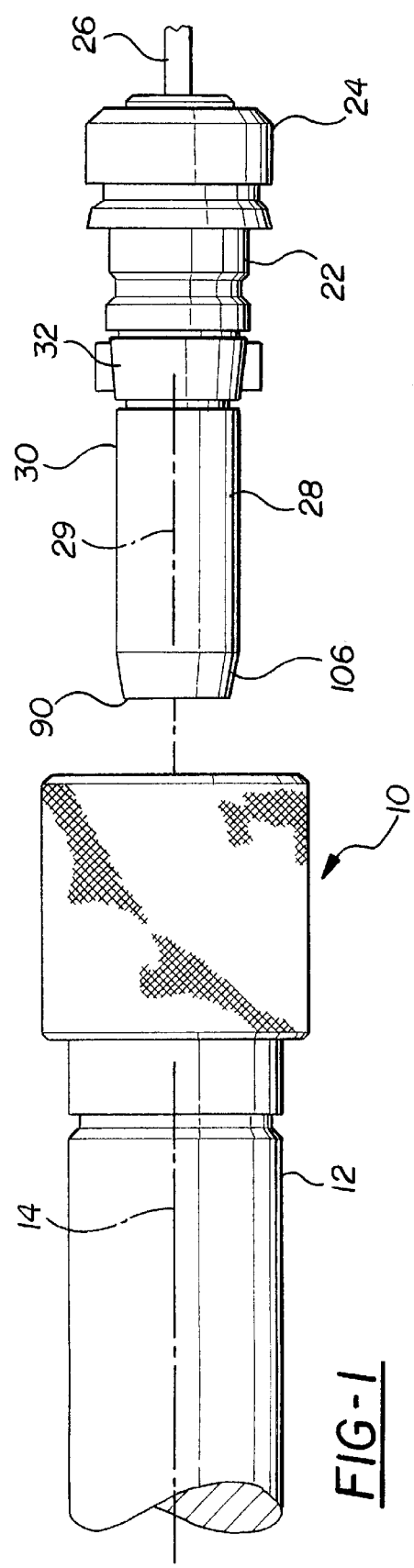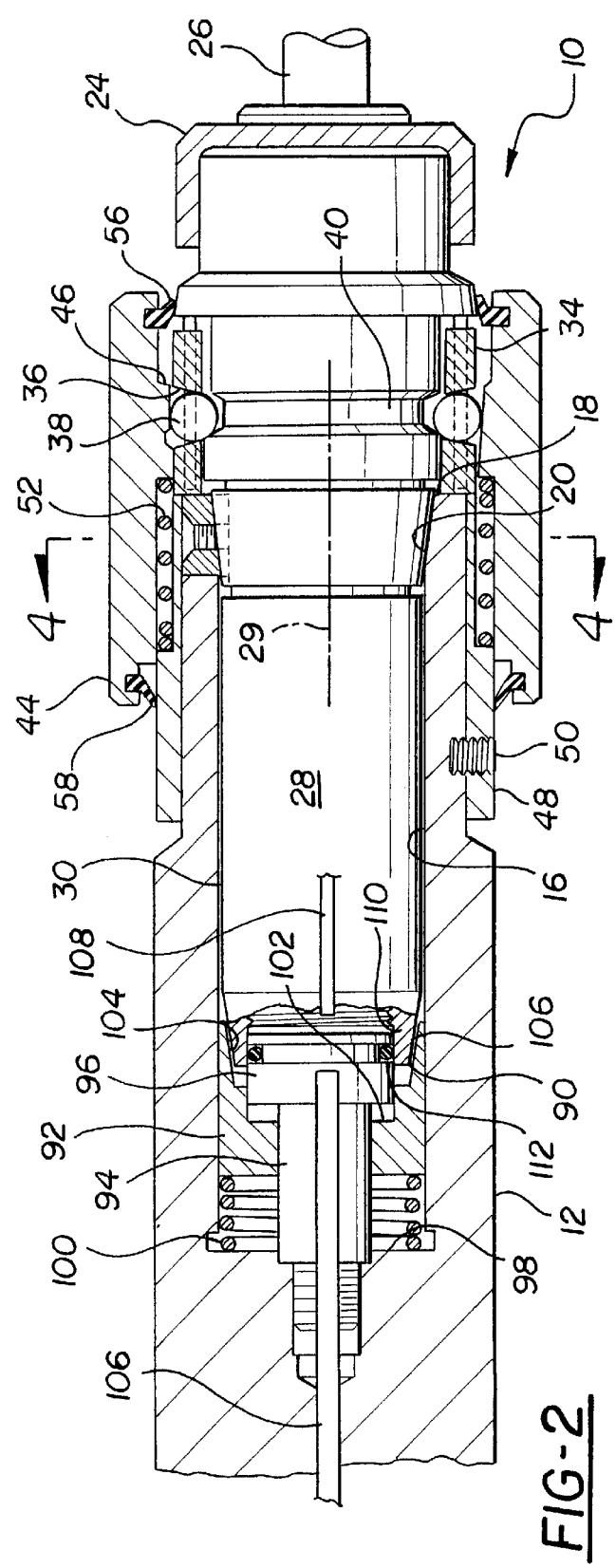

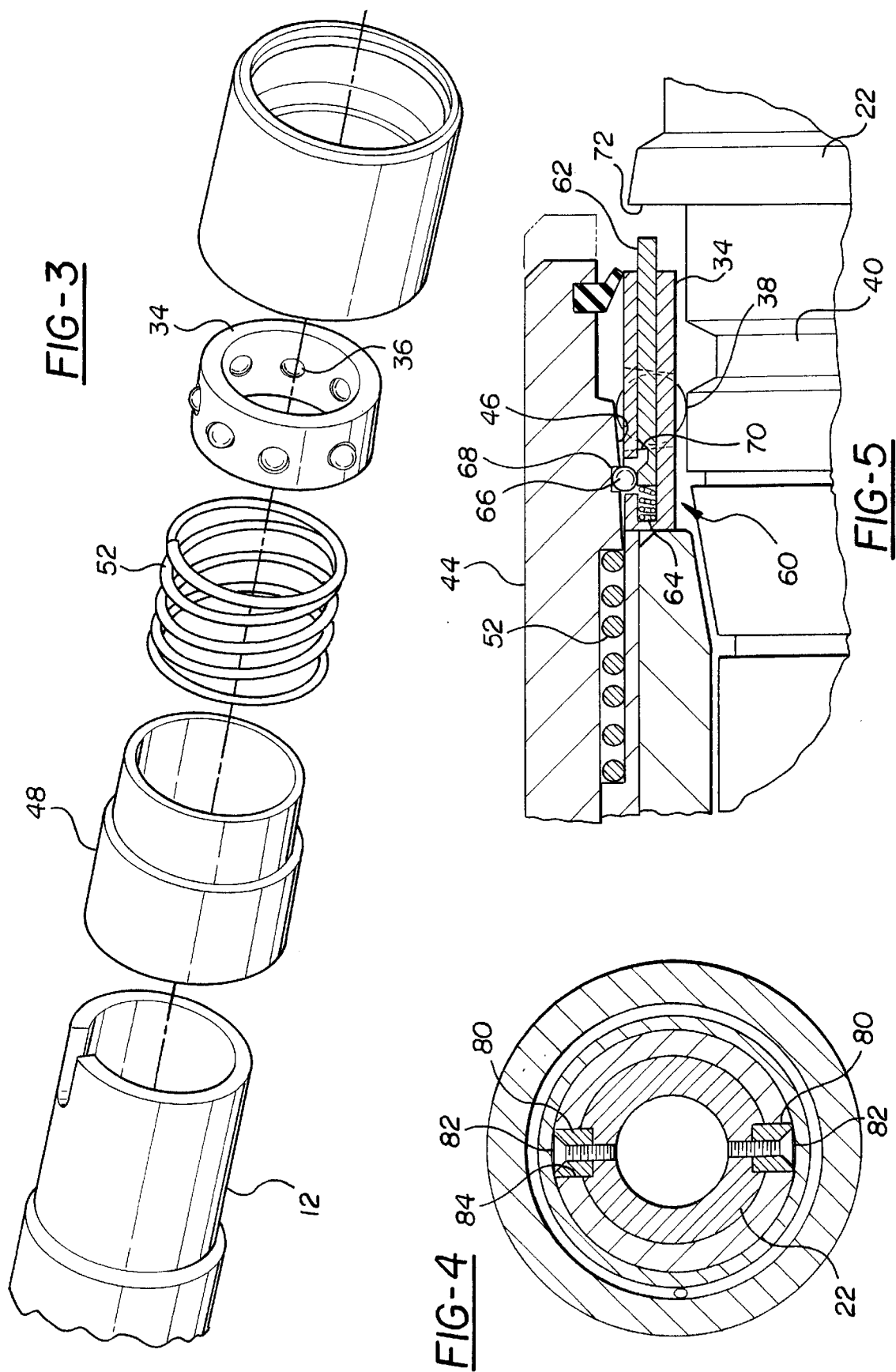

TOOL HOLDER ASSEMBLY

BACKGROUND OF THE INVENTION

I. Field of the Invention

The present invention relates generally to toolholder assemblies and, more particularly, to a quick release toolholder assembly.

II. Description of the Prior Art

There are many previously known toolholders of the type used in manufacturing operations. These toolholders typically comprise a chuck having a collet for securing a tool, such as a drill, reamer or the like, coaxially to the chuck. The chuck, in turn, includes an elongated shank which is inserted into a receiving bore on a rotatably driven spindle. The spindle bore is coaxial with the axis of rotation of the spindle so that, in the ideal situation, the tool secured by the collet to the chuck is coaxial with the axis of rotation of the spindle.

In one type of previously known toolholder assembly, cooperating conical surfaces are formed on both the chuck shank as well as the spindle bore in order to center the axis of the chuck with the axis of the spindle. In other cases, however, both the spindle bore as well as the chuck shank are cylindrical in shape and are simply machined to sufficiently close tolerances to ensure that the axis of the chuck is coaxial with the axis of the spindle.

Following insertion of the chuck shank into the spindle bore, there are at least two different commonly used means for releasably securing the chuck to the spindle. In the first, an internally threaded collar is rotatably mounted on the chuck. This internally threaded collar rotatably engages external threads formed on either the spindle or an adapter mounted to the spindle. Consequently, as the threaded collar is tightened onto the spindle, the chuck is moved into its operative position with respect to the spindle. In the case of cooperating conical surfaces, the conical surfaces mate against each other to center the chuck with respect to the spindle. In the case of a cylindrical shank, rotation of the collar causes a flat machine at the end of the spindle to flatly abut against a flat machine on the chuck in order to secure the chuck to the spindle against movement.

In still a further type of toolholder assembly, a ball lock arrangement is provided for releasably securing the chuck to the spindle. In the conventional ball lock arrangement, a plurality of balls are carried by the spindle which face a receiving groove formed in the chuck once the chuck is inserted into the spindle bore to its operative position. An axially slidable sleeve is mounted to the spindle and movable between a locked and unlocked position. In its locked position, the sleeve includes a cam surface which presses the balls into the receiving groove on the chuck thus locking the chuck to the spindle against axial movement. Conversely, in its unlocked position, the sleeve cam surface is retracted away from the balls thus allowing the balls to move radially outwardly and enable both the insertion and removal of the chuck from the spindle bore.

A primary advantage of the previously known toolholder assemblies having a ball lock for securing the chuck to the spindle is that chucks having different tools may be rapidly changed for the spindle.

A primary disadvantage, however, of the previously known toolholder assemblies utilizing a ball lock is that the ball lock provides a less secure attachment between the chuck and the spindle than obtainable by the previously known threaded collar locking arrangements. Consequently, these previously known toolholder assemblies utilizing a ball lock have been known to rock slightly during machining operations. For that reason, such ball lock assemblies are oftentimes called "rockers" in the industry.

SUMMARY OF THE PRESENT INVENTION

The present invention provides a ball lock toolholder assembly which overcomes all of the above-mentioned disadvantages of the previously known devices.

In brief, the toolholder assembly of the present invention comprises an elongated spindle adapted to be rotatably driven about a longitudinal axis. The spindle also includes a longitudinally extending bore open at one end. The bore is generally cylindrical in shape and preferably has a conical section adjacent the open end of the bore.

A chuck includes a conventional collet for securing a tool, such as a drill, coaxially to the chuck. The chuck also includes an elongated shank which is adapted for insertion into the spindle bore as well as a conical section which is complementary to the conical section formed adjacent the open end of the spindle bore. These conical surfaces cooperate to center the axis of the chuck with the axis of the spindle.

A plurality of circumferentially spaced and radially movable balls are carried by an annulus mounted to the spindle adjacent its open end. These balls register with an annular groove formed around the outer periphery of the chuck when the chuck is inserted into the spindle to its operative position.

In order to lock the chuck to the spindle in its operative position, an annular sleeve is coaxially mounted to the spindle at the open end of the bore. The sleeve is axially movable between a locked and an unlocked position. In its locked position, a cam surface formed on the interior of the sleeve cooperates with the balls to force the balls radially inwardly into the chuck recess thus locking the chuck to the spindle. Conversely, in its unlocked position, the sleeve cam surface is retracted away from the balls to permit the balls to move radially outwardly thereby releasing the chuck from the spindle.

In order to prevent rocking of the chuck relative to the spindle, a piston having a conical surface coaxial with the axis of the spindle is mounted to the spindle at the innermost end of the spindle bore. This piston is axially movable between a first and second position in which the first position is closer to the open end of the spindle bore than the second position. A helical compression spring urges the piston towards its first position while a fastener extending through the piston limits the axial movement of the piston as well as maintains the piston coaxial with the axis of the spindle.

A conical surface is also formed on the outer periphery of the chuck shank at its free end. Thus, upon insertion of the chuck shank into the spindle bore to the operative position of the chuck, the conical surfaces on the piston and shank end engage each other so that the piston both supports the free end of the chuck shank and also maintains the free end of the chuck shank coaxial with the axis of rotation of the spindle. Consequently, since the chuck is supported by the spindle at both its forward and rearward end, any "rocking" of the chuck relative to the spindle is effectively precluded.

A lubricant passageway is also optionally provided through the piston fastener and registering lubricant passageway formed in the chuck shank.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a longitudinal exploded side view illustrating a preferred embodiment of the present invention;

FIG. 2 is a longitudinal sectional view illustrating the preferred embodiment of the invention;

FIG. 3 is an exploded view illustrating the preferred embodiment of the present invention;

FIG. 4 is a sectional line taken substantially along line 4—4 in FIG. 2; and

FIG. 5 is a fragmentary exploded view illustrating a portion of the preferred embodiment of the present invention.

DETAILED DESCRIPTION OF A PREFERRED EMBODIMENT OF THE PRESENT INVENTION

With reference first to FIGS. 1–3, a preferred embodiment of the toolholder assembly 10 of the present invention is there shown and comprises a spindle 12 adapted to be rotatably driven about its longitudinal axis 14. The spindle 12 includes a longitudinally extending bore 16 open at one end 18 of the spindle 12. Preferably, the spindle bore 16 is generally cylindrical in shape and includes an outwardly flared conical surface 20 adjacent the end 18 of the spindle 12.

Referring now particularly to FIGS. 1 and 2, the toolholder assembly 10 further comprises a chuck 22 having a collet 24, or other conventional means, for coaxially securing a tool 26 to the chuck 22.

The chuck 22 includes an elongated shank 28 dimensioned for insertion into the spindle bore 16 to an operative position, as illustrated in FIG. 2. Consequently, the shank 28 includes a generally cylindrical portion 30 as well as a conical portion 32 complementary to the conical surface 20 on the spindle bore 16. Furthermore, the chuck shank 30 and cylindrical portion 32 are coaxial with the axis of the tool 26 held by the collet 24.

With reference now to FIGS. 2 and 3, an annulus 34 is coaxially mounted around the end 18 of the spindle 12. This annulus 34 includes a plurality of conical openings 36 and a spherical ball 38 is positioned in each opening 36.

The conical openings 36 are dimensioned so that their smaller diameter end is less than the diameter of the ball 38. Consequently, the balls 38 are able to protrude slightly inwardly from the annulus 34 but are restricted from completely passing radially inwardly through the annulus 34. The conical openings 36, however, permit the balls 38 to move radially relative to the axis 29 of the chuck 22. Furthermore, with the chuck 22 inserted into the spindle bore to an operative position, the balls 38 register with an annular recess 40 formed around the outer periphery of the chuck 22.

With reference now to FIGS. 2 and 5, in order to lock the chuck 22 to the spindle 12, an axially slidable sleeve 44 is coaxially disposed around the spindle 12 adjacent its end 18. This sleeve 44 is axially movable between a locked position illustrated in phantom line in FIG. 5 and in FIG. 2, and an unlocked position, illustrated in solid line in FIG. 5. In its locked position, a cam surface 46 on the inner periphery of the sleeve 44 engages and forces the balls 38 radially inwardly and into the annular groove 40 on the chuck 22. FIG. 2, for example, illustrates the sleeve 44 in a substantially but not fully locked position.

Conversely, with the sleeve moved to its unlocked position (solid line in FIG. 5) the cam surface 46 enables the balls 38 to move radially outwardly and out of the recess 40. Thus, with the sleeve 44 in its unlocked position, the chuck 22 can be removed from and inserted into the spindle bore 16.

With reference now to FIG. 2, in the preferred embodiment of the invention, the sleeve 44 is preferably mounted to a collar 48 secured to the spindle 12 by a fastener 50. Alternatively, however, the sleeve 44 can be directed secured to the spindle 12. Furthermore, a helical compression spring 52 is sandwiched in between the sleeve 44 and collar 48 which urges the sleeve 44 towards its locked position.

Still referring to FIG. 2, in order to prevent debris and other contaminants from entering into the spindle bore 16, an annular resilient seal 56 is carried by the sleeve 44 at one end and this seal 56 engages the outer periphery of the chuck 22. Similarly, a second annular resilient seal 58 is carried at the opposite or inner end of the sleeve 44 and this seal 58 sealingly engages the outer periphery of the collar 48.

With reference now particularly to FIG. 5, a catch assembly 60 is provided for retaining the sleeve 44 in its unlocked position following removal of the chuck 22 from the spindle bore 16. This catch assembly 60 includes a catch pin 62 which is axially slidably mounted in an axial bore in the annulus 34. This catch pin 62 is resiliently urged outwardly by a spring 64.

A catch ball 66 is positioned within a transverse bore which intersects the catch pin bore. The catch ball 66 registers with a catch recess 68 formed in the sleeve 44 when the sleeve 44 is moved to its unlocked position.

Upon insertion of the chuck 22 into the spindle bore 16, a flat 72 on the chuck 22 engages the free end of the catch pin 62 and axially displaces the catch pin 62 axially inwardly towards the spindle 12. When this occurs, a notch 70 on the catch pin 62 registers with the catch ball 66 and allows the catch ball 66 to move radially inwardly thus releasing the sleeve 44 from the spindle 12 and allowing the sleeve 44 to move under the force of the spring 52 to its locked position.

Likewise, upon removal of the chuck 22 from the spindle 16, the sleeve 44 is moved to its unlocked position and the chuck 22 removed from the spindle bore 16. When this occurs, the spring 64 moves the catch pin 62 to the position shown in FIG. 5 thus moving the catch ball 66 into the position shown in FIG. 5 thereby retaining the sleeve 44 in its unlocked position.

With reference now to FIG. 4, in order to lock the chuck 22 against rotation relative to the spindle 12, at least one and preferably two outwardly protruding lugs 80 are secured to the chuck 22 by fasteners 82. These lugs 80 are received within axially extending slots 84 formed at the end 18 of the spindle 12.

With reference now to FIG. 2, in order to both center and support the innermost or free end 90 of the chuck shank 28, an annular piston 92 is secured within the innermost end of the spindle bore 16 by a fastener 94 having an enlarged head 96. The piston 92 is axially slidably movable between a first or extended position and a second or retracted position. In its first or extended position, an annular surface 102 on the piston 92 abuts against the enlarged head 96 of the fastener 94. Conversely, in its second or retracted position, the piston 92 is more spaced from the open end 18 of the spindle 12 than in its first position. A helical spring 100 is sandwiched in between the inner end 98 of the spindle bore 16 and the piston 92 which urges the piston 92 towards its first position. Furthermore, as illustrated in FIG. 2, the piston 92 is illustrated at a position intermediate its first and second positions.

The piston 92 has an outer diameter substantially the same as the diameter of the bore 16 so that the piston 92 remains coaxial with the spindle axis 14. The fastener also aids in maintaining the piston 92 coaxial with the spindle axis 14.

Still referring to FIG. 2, the piston 92 includes a conical surface 104 which is coaxial with respect to this axis 14 of the spindle 12. This conical surface 104 engages a complementary conical surface 106 formed at the free end 90 of the chuck shank 24 when the chuck 22 is inserted into the spindle bore 16 to its operative position. In doing so, the piston 92 not only aligns but also supports the end 90 of the chuck shank 28.

If lubrication of the cutting tool is desired, the toolholder assembly 10 includes a lubrication passageway 106 formed coaxially through the fastener 94. This lubrication passageway 106 registers with a like lubrication passageway 108 formed through the chuck shank 28.

In order to prevent leakage of the lubrication at the inner end 98 of the spindle bore 16, the enlarged fastener head 96 is received within a circular recess 110 at the end 90 of the chuck shank 28 when the chuck 22 is in its operative position. A fluid seal 112 carried by the enlarged head 96 of the fastener 94 then fluidly seals the fastener 94 to the chuck shank 28.

In operation and assuming that the chuck 22 has not yet been inserted into the spindle bore 16, the catch ball 66 retains the sleeve 44 in its unlocked position as shown in FIG. 5. Upon insertion of the chuck 22 into the spindle bore 16, the chuck 22 engages the catch pin 62 (FIG. 5) thus releasing the sleeve 44 to move to its locked position.

Simultaneously upon insertion of the chuck 22 into the spindle bore 16, the end 90 of the chuck shank 28 engages the piston 92 and moves the piston from its first and towards its second position. In doing so, as previously described, the piston 92 both aligns and supports the end 90 of the chuck shank 28.

From the foregoing, it can be seen that the present invention provides an improved toolholder assembly which overcomes all of the above-mentioned disadvantages of the previously known toolholder assemblies. Having described my invention, however, many modifications thereto will become apparent to those skilled in the art to which it pertains without deviation from the spirit of the invention as defined by the scope of the appended claims.

We claim:

1. A toolholder assembly comprising:
    an elongated spindle adapted to be rotatably driven about a longitudinal axis, said spindle having a longitudinally extending bore open at one end,
    a chuck having an elongated shank and means at one end of said shank for coaxially securing a tool to said shank, a second end of said shank adapted for insertion into said spindle bore,
    means attached to said spindle for releasably coaxially securing said chuck to said spindle upon insertion of said chuck shank into said spindle bore to an operative axial position,
    a piston longitudinally movably mounted in said spindle bore on a guide fastener, said guide fastener being secured to said spindle at said second end of said bore and engaging said second end of said shank upon insertion of said chuck into said spindle bore, a spring disposed between said spindle and said piston which resiliently urges said piston toward said first end of said bore, said piston having an axially extending surface which engages a mating surface on said second end of said chuck shank and centers said second end of said chuck shank upon insertion of said chuck to said operative position.

2. The invention as defined in claim 1 wherein said chuck includes an annular recess about an outer periphery of the chuck adjacent said first end of said chuck and wherein said securing means comprises a sleeve mounted on said spindle and movable between a locked position and an unlocked position, a plurality of circumferentially spaced and radially movable balls mounted to said spindle such that said balls are aligned with said chuck recess when said chuck is at said operative position, and said sleeve having a cam surface cooperating with said balls to force a portion of said balls into said chuck recess when said sleeve is in said locked position.

3. The invention as defined in claim 2 and comprising a compression spring which urges said sleeve towards said locked position.

4. The invention as defined in claim 2 and comprising a collar secured to said spindle, said sleeve being axially slidably mounted to said collar.

5. The invention as defined in claim 4 and comprising a compression spring axially compressed between said collar and said sleeve so that said spring urges said sleeve towards said locked position.

6. The invention as defined in claim 1 wherein both said piston mating surface and said mating surface on said second end of said chuck shank are conical in shape.

7. The invention as defined in claim 1 wherein said spring comprises a helical compression spring.

8. The invention as defined in claim 1 wherein said fastener has an enlarged head at one end and threads at a second end, and said second end of said fastener threadably engaging a threaded bore in said spindle.

9. The invention as defined in claim 8 and comprising registering lubricant passageways in said fastener and said shank.

10. The invention as defined in claim 9 wherein said shank includes a cylindrical recess at its second end, said cylindrical recess dimensioned to receive said enlarged head, and a fluid seal disposed between said enlarged head and said cylindrical recess.

11. The invention as defined in claim 10 wherein said seal is carried in a groove on said enlarged head.

12. The invention as defined in claim 2 and comprising a first seal operatively positioned between one end of said sleeve and said chuck, and a second seal operatively positioned between said sleeve and said spindle.

13. The invention as defined in claim 12 wherein each seal comprises a resilient swiper.

14. The invention as defined in claim 2 and comprising means for retaining said sleeve in said unlocked position upon removal of said chuck from said spindle bore.

15. The invention as defined in claim 14 wherein said retaining means comprises a catch pin axially slidably mounted to said spindle, said catch pin cooperating with a catch ball to force said catch ball into a recess on said sleeve when said sleeve is in said unlocked position and said chuck removed from said spindle bore.

* * * * *